United States Patent Office 3,445,943
Patented May 27, 1969

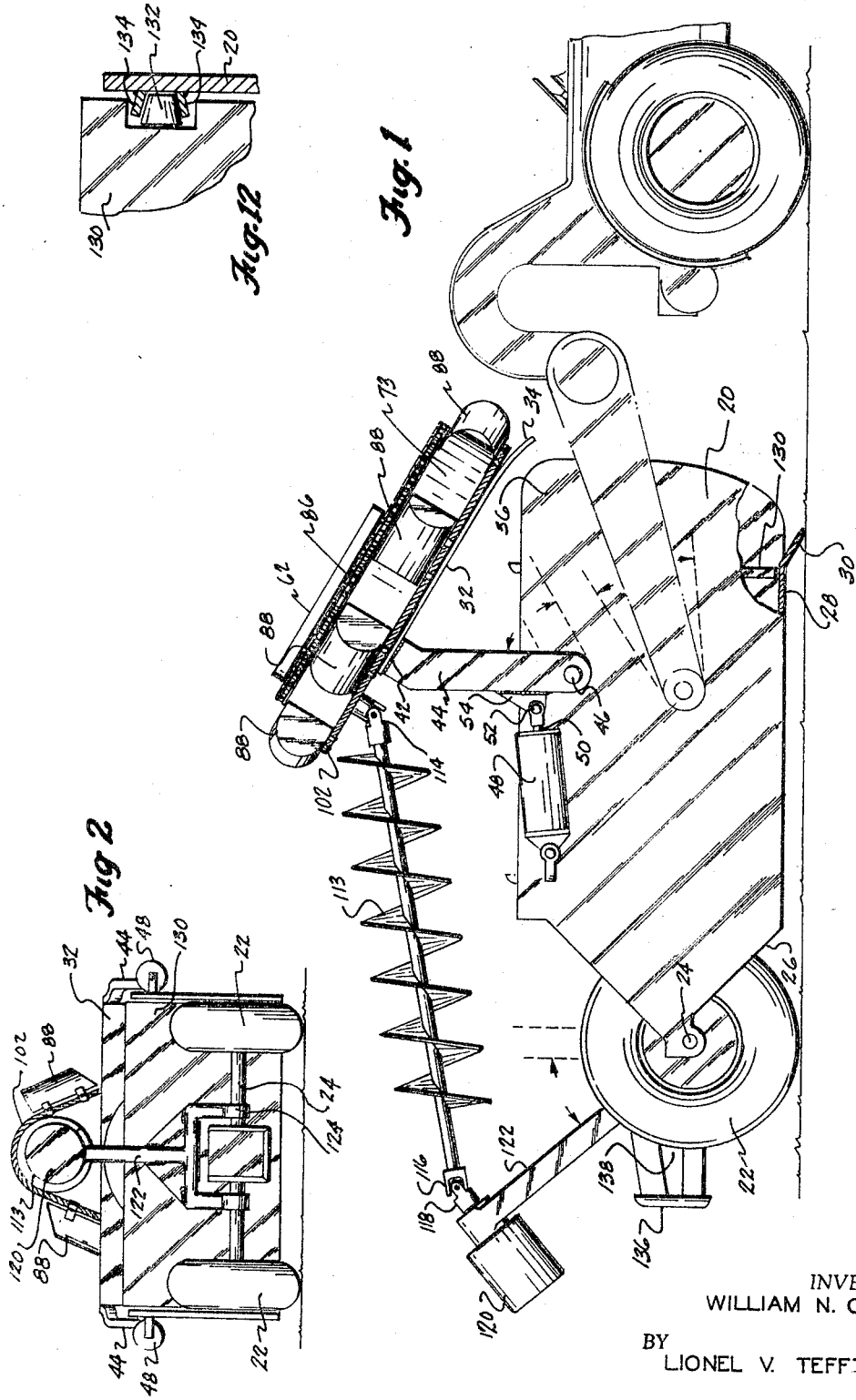

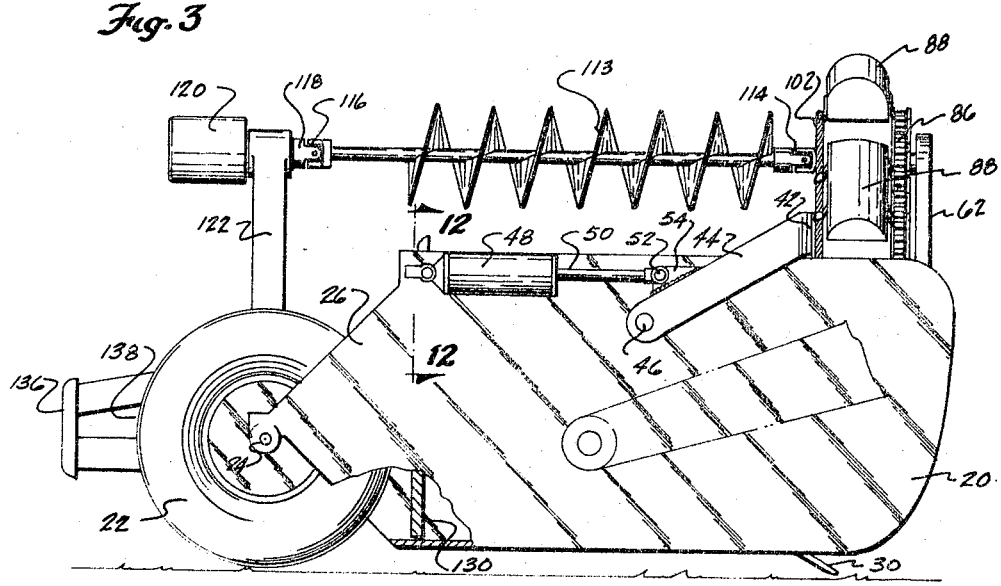
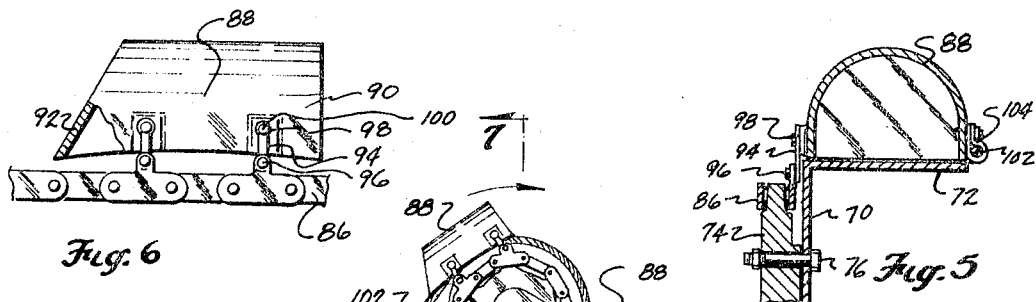
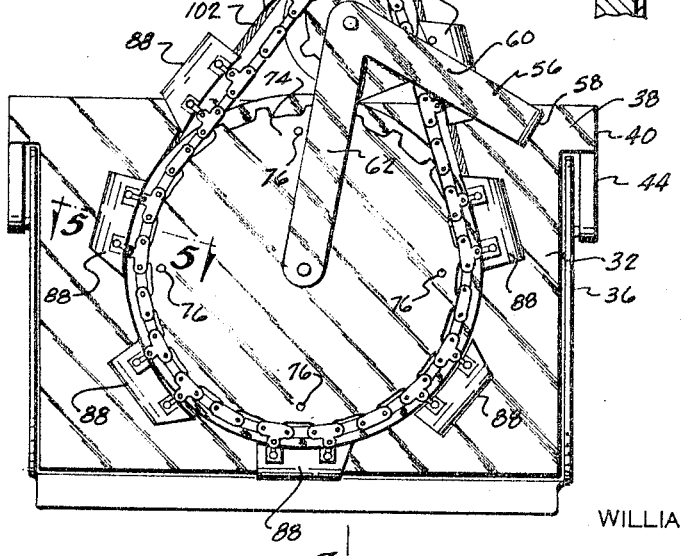
INVENTOR.
WILLIAM N. CRUM
BY LIONEL V. TEFFT
ATTORNEY

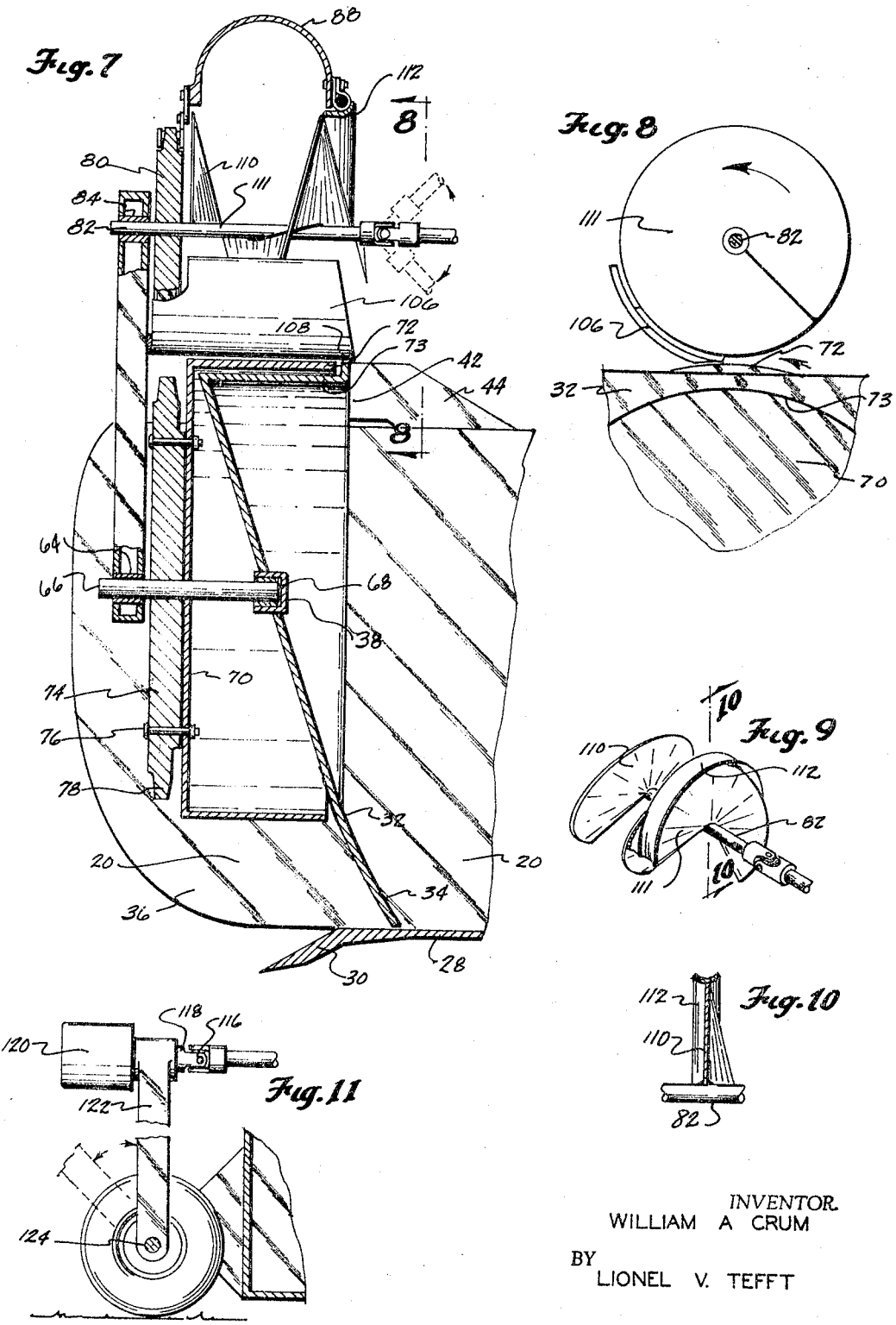

3,445,943
LOADING DEVICES FOR CARRYALLS
William N. Crum, 81271 Interstate 10,
Indio, Calif. 92201
Filed May 6, 1966, Ser. No. 558,186
Int. Cl. B60p 1/04, 1/42
U.S. Cl. 37—9    4 Claims

ABSTRACT OF THE DISCLOSURE

Apparatus for assisting the loading of a conventional carryall including a material elevating device attached to the pivoted apron thereof and operating to deliver overhead to the carryall, and an overhead auger pivoted to the apron and the coverall for leveling the material and movable to an out-of-the-way position during the dumping operation.

---

This invention relates generally to loading devices for carryalls and particularly to self-loading mechanism attachable to the adjustable apron and operating in a manner to reduce power.

One of the main objects of the invention is in the provision of a carryall or scraper self-loader on the apron end for elevating material at the blade edge and delivering from an overhead position.

Another object of the invention is to provide auxiliary connected overhead auger mechanism that will distribute accumulated material in the scraper rearwardly for rapid and complete loading.

Still another object of the invention is in the provision of a self-loading and distributing device that is attachable to the carryall in a manner to move and operate simultaneously with the adjustable position of the scraper apron.

Yet another object of the invention is to provide an apron attached overhead self-loading device that will operate when the apron is closed or partly open to take care of differing conditions.

A further object of the invention is in the provision of a specially designed trencher bucket line self-loader attachable to or made a part of the apron.

A still further object of the invention is to provide an overhead material distributing auger universally connected to the bucket line loader and to a rear axle pivoted support so as to be moveable with and cooperate with the apron in the loading and dumping operations.

Another object of the invention is in the association of a front apron attached self-loading elevator and an overhead auger for rear material distribution whereby they operate in self powered communication with the apron irrespective of its adjusted or carryall dumping position.

Yet another object of the invention lies in the special arrangement of trencher line buckets on the driven material drum including the overhead delivery means to the forward end of the carryall.

These and other objects and advantages of the present invention will become apparent to those skilled in the art upon consideration of the following detailed description of the preferred embodiment thereof, reference being made to the accompanying drawings, herewith, wherein:

FIGURE 1 is an elevational view of the device in carryall dumping position;

FIGURE 2 is a rear elevational view of the carryall with self-loading device attached;

FIGURE 3 is an elevational view of the device in operating position;

FIGURE 4 is a front elevational view of the apron attached self-loader.

FIGURE 5 is a view taken on the line 5—5 of FIGURE 4;

FIGURE 6 is an enlarged elevational view of one of the trencher buckets;

FIGURE 7 is a view taken on the line 7—7 of FIGURE 4;

FIGURE 8 is a view taken on the line 8—8 of FIGURE 7;

FIGURE 9 is an enlarged perspective view of the short auger.

FIGURE 10 is a view taken on the line 10—10 of FIGURE 9;

FIGURE 11 is a partial elevational view showing the rear axle pivotal power mounting; and FIGURE 12 is a view taken on the line 12—12 of FIGURE 3.

The fundamental theory of the present invention is to provide an auxiliary self-loader for a conventional carryall or scraper loader. The self-loader may be either attached to or be made an integral part of these well known earth or material scraping and loading devices. There are various types of carryall structures of different manufacture and the drawings merely show a well known type which has an adjustable apron adjacent the scraper blade. A tractor is used to pull or push the scraper and different means are used to dump or eject the loaded material. As far as applicant's device is concerned, it is merely required that the carryall or scraper have the usual adjustable front apron adjacent the scraper blade.

Referring to the drawings a conventional carryall or scraper loader is shown generally at 20. There is a wheel 22 and axle 24 suspension connected to the rear projecting ends 26 of the loader 20. A bottom 28 has a forwardly and downwardly projecting scraper blade 30 that may be of any conventional type. As stated, any conventional means for dumping the loaded earth or material may be used and is not essential to the present invention. It is important that the carryall have an adjustable apron and this fundamental conventional front closure member is shown at 32. Applicant has shaped the apron 32 for attachment of his auxiliary self-loading mechanism. The apron 32 has an inwardly blade operating adjacently disposed partial section 34 lying within the forwardly extending sides 36 of the scraper loader. From the section 34, the loader end closing apron 32 extends outwardly and upwardly at 38 and then rearwardly and horizontally at 40. Dual ears 42 on the upper end of the apron have welded thereto the forward ends of dual supporting and adjusting beams 44 pivotally connected at 46 to the carryall sides. Means for adjusting the apron 32 during the scraping and loading operation and for elevating it to position for final material ejection or dumping are shown as dual side supported hydraulic cylinders 48, shafts 50 and pivoted connections 52 with cams 54 on the beams 44. Applicant merely shows one of many different means that may be employed to adjust and raise the conventional apron 32 without departing from the spirit of the invention.

To the conventional structure, as generally understood, applicant now attaches his auxiliary partial and possibly complete self-loading structure. A supporting beam 56 is welded to the upper front end of the apron at 58. It extends outwardly and then diagonally upward at 60 to a point above the apron and then downwardly at 62 where it provides a bearing support 64 for a shaft 66 journaled at 68 in the apron 32 or rather portion 38 thereof. A circular dirt drum has vertical surface 70 secured to the shaft 64 and a horizontal bucket supporting dirt surface 72 extending inwardly therefrom and over a similarly rounded horizontal part 73 of the apron 32.

A large sprocket wheel 74 is plurally connected at 76 to drum surface 70 and is centered on the shaft 66. It will be noted that the large sprocket wheel 74 or rather the toothed periphery 78 thereof lies slightly below the outer edge of the drum surface 70. A small toothed sprocket wheel 80 is mounted on an overhead short drive shaft 82 that finds a bearing support 84 in the upper apex of supporting members 56 and 62. A continuous outer bucket chain 86 connects the sprockets 74 and 80 and lies just below the horizontal dirt and bucket surface 72. It will be noted that the overhead sprocket 80 has an offset position slightly to the right of the upper edge of the drum surface 72. Specially formed plural trencher line buckets 88 have slightly curved outer side connecting surfaces 90 and downwardly and outwardly angled rear ends 92. The buckets 88 have similar dual connections 94 with spaced links on the chain 86. The connecting members 94 are pivoted at 96 to the spaced chain links and at their outer ends have loose joint engagement at 98 with lugs 100 projecting from the outer sides of the buckets 88. A continuous cable 102 is connected at 104 to the inner bucket surface as shown in FIGURE 5. It will be noted that the suspension of the chain 86 below the edge of the drum surface 72 and the loose bucket and chain connections will tend to hold the buckets in fairly tight earth or material holding position on the drum.

The material is elevated to an overhead offset position with respect to the drum surface 72. An arcuately formed earth or material catcher 106 connected to the apron upper edge at 108 tends to stop material drum movement at a point where it is picked up and delivered rearwardly by blades 110 on a short auger 111 secured to the short drive shaft 82. A specially formed cable guide 112 on the inner auger blade 110 provides means for carrying the buckets over the short auger 111. The earth or material drops inwardly of the apron 32 into the front portion of the carryall. The material of course collects and rises upwardly in the loader. Means for rearwardly distributing the forwardly loaded material is provided by an overhead longitudinally disposed elongated auger 113 having a forward universal connection 114 with the short drive shaft 82 and a rear universal connection 116 with a power shaft 118 of a power member 120 of any appropriate character mounted on a vertical support 122 which is pivotally connected at 124 on either the carryall rear axle or some part of the loader scraper.

The described partial or complete self-loading device may be attached to any kind of carryall or scraper loader having an adjustable apron. In the drawings a conventional carryall dirt or material ejection means has been shown. A dirt or material ejection plate is shown at 130 having conical roller connection 132 in roller supporting guides 134 on the upper inner sides of the carryall. A spider 136 operated ram 138 may be used to force the ejector plate 130 forwardly to the dumping position shown in FIGURE 1. As far as the present invention is concerned, the manner of material removal is unimportant as long as the auxiliary or self-loading device is attachable to an adjustable apron type carryall.

The operation of the device is as follows: The carryall or scraper loader is drawn or pushed so that the earth or material engaging blade diverts said material upwardly and into the carryall beneath the adjustable apron 32. Irrespective of the adjusted position of the apron 30, the driven trencher bucket line will pick up the blade raised material and elevate it on the simultaneously rotating drum until the stop is reached. The short bladed auger will move the material slightly rearwardly where it will fall into the front end of the carryall. The trencher bucket arrangement as described will tend to hug the dirt drum closely and prevent any material dirt exodus. As the dirt or material rises in the carryall, it will be distributed rearwardly in an even manner to fully load same with greatly reduced power.

The pivoted power support and dual universal engagement permits auxiliary loading operation within certain limits of adjustable position of the apron. It is apparent, as shown in FIGURE 1, that the device will be in inoperative elevated position during the dirt or material ejection period. The type and manner of power support is variable as long as the device has the dual universal connection with the adjustable apron.

While I have described in considerable detail what I believe to be the preferred form of my invention, it will be understood by those skilled in the art that various changes may be made in the shape and arrangement of the several parts.

I claim:

1. An auxiliary loading device for conventional carryalls or bladed scraper loaders having dirt or material ejector means, comprising:
   a loader having an open forward end;
   an apron pivotally mounted and upwardly moveable on the open end of the loader, and normally positioned with its lower end adjacent the bladed portion of the loader and closing said open end;
   a power driven continuously operating material elevating mechanism attached to the forward or outer surface of the apron and moveable with the apron for overhead delivery with the carryall or loader; and
   an overhead power driven substantially horizontally disposed distributing auger in the carryall pivotally connected at its forward end to the apron and to a moveable part of the carryall or loader at its rear end for out of the way position during the material ejection operation.

2. A device as set forth in claim 1 in which at least one auger having a universal mounting at both ends is used.

3. A device as set forth in claim 2 in which the elevating means is a bucket type elevator mounted on a rotating drum that forms one side of the buckets.

4. A device as set forth in claim 3 in which the elevating buckets deliver material to a short overhead auger that delivers into the carryall.

References Cited

UNITED STATES PATENTS

| | | | |
|---|---|---|---|
| 2,916,135 | 12/1959 | Likens | 37—8 X |
| 3,210,868 | 10/1965 | Liess | 37—8 |
| 3,296,716 | 1/1967 | Rezabek et al. | 37—129 X |
| 3,343,286 | 9/1967 | Ray et al. | 37—8 |

OTHER REFERENCES

Printed German patent application No. 1,188,507, March 1965, to Schwabe et al.

ANTONIO F. GUIDA, *Primary Examiner.*

STEPHEN C. PELLEGRINO, *Assistant Examiner.*

U.S. Cl. X.R.

214—83.32